United States Patent [19]

Johnson

[11] Patent Number: 5,191,392
[45] Date of Patent: Mar. 2, 1993

[54] WHITE LIGHT OPTICAL TRANSFORM DEVICE

[75] Inventor: John L. Johnson, Huntsville, Ala.

[73] Assignee: The United States of America as represented by the Secretary of the Army, Washington, D.C.

[21] Appl. No.: 757,054

[22] Filed: Sep. 9, 1991

[51] Int. Cl.$^5$ ............................................. G01B 9/02
[52] U.S. Cl. .................................. 356/353; 356/346; 356/365; 359/499
[58] Field of Search ............... 356/353, 346, 364, 365, 356/367; 359/559, 494, 496, 499, 500

[56] References Cited

U.S. PATENT DOCUMENTS

| | | | |
|---|---|---|---|
| 3,399,591 | 9/1968 | Drougard et al. | 356/351 |
| 4,624,563 | 11/1986 | Johnson | 356/365 |
| 4,626,100 | 12/1986 | Johnson | 356/365 |

OTHER PUBLICATIONS

"Use of Savart Plates in Grating Interferometers," by T. H. Peek Applied Optics, vol. 10, No. 5, May 1971, pp. 1092-1096.

"Generalization of Francon's Modification of the Savart Plate," by T. H. Peek, Applied Optics, vol. 10, No. 10, Oct. 1971, pp. 2235-2239.

*Primary Examiner*—Samuel A. Turner
*Attorney, Agent, or Firm*—Freddie M. Bush; Hay Kyung Chang

[57] ABSTRACT

The White Light Optical Fourier Transform Device comprises symmetrical wedges of uniaxial birefringent crystal placed on either side of a half-wave plate to induce an angle between the wavefronts of the polarized components of the beam travelling through the device. The wavefront tilt angle of the output beam is shown to be linearly proportional to the angle of incidence. This is sufficient to generate the necessary phase factor for a Fourier transform of the incident intensity image.

3 Claims, 3 Drawing Sheets

WHITE LIGHT OPTICAL TRANSFORM DEVICE

DEDICATORY CLAUSE

The invention described herein may be manufactured, used, and licensed by or for the Government for governmental purposes without the payment to me of any royalties thereon.

BACKGROUND OF THE INVENTION

Previous extant Fourier transform techniques include using diffraction-limited lenses and pinhole arrays with coherent light and zone-plate shadow masks with incoherent light. There exists no known device or method that works both in coherent and incoherent lights to produce Fourier transform of incident light by use of polarization encoding.

SUMMARY OF THE INVENTION

A White Light Optical Fourier Transform Device, (hereinafter referred to as the Transform Device), comprised of symmetrically positioned birefringent crystal wedges and a half-wave plate inserted between them is placed in the path of light, incoming at an angle of incidence, $\theta$. The Transform Device functions in both coherent and incoherent lights to produce the Fourier transform of the incident light beam by inducing a relative angle (hereinafter referred to as the "tilt angle") between the wavefronts of the two polarized components of the output beam. With the Transform Device, this angle is linearly proportional to the angle of incidence. The output produced by the Transform Device is the Fourier transform itself rather than its square, as is the case for coherent Fourier transforms using a lens as the transform element. The effect of the linear relationship between the tilt angle and the incident angle is sufficient to take the Fourier transform of an incident intensity image in both one and two dimensions. The output of the Transform Device is offset by a d.c. bias and has a positive and negative spatial frequency ambiguity. The Transform Device operates over the entire visible spectrum provided that the half-wave plate used is achromatic. Further, the Transform Device consumes no power and works equally with incoherent as well as with coherent lights since it is based on polarization rather than the coherence of the incident light.

DESCRIPTION OF THE PREFERRED EMBODIMENT

Figure 1:
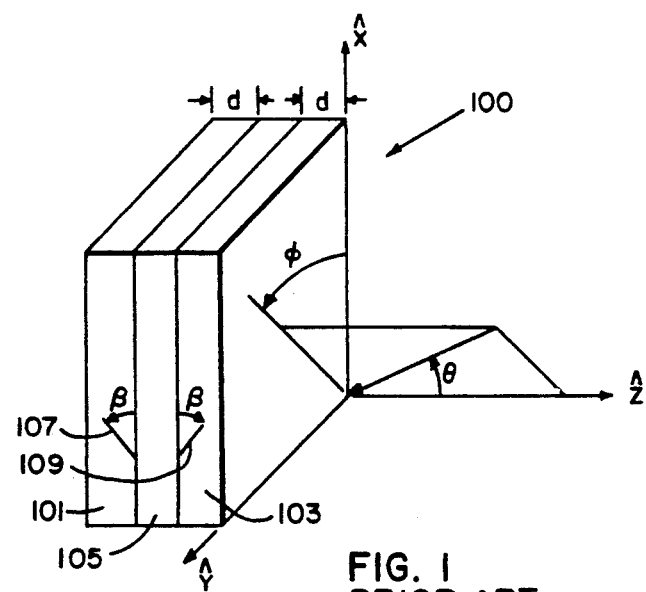
FIG. 1 shows a symmetrical savart plate.

Referring now to the drawings wherein like numbers refer to like parts, FIG. 1 shows a symmetrical savart plate which consists of two flat plates, 101, 103 of uniaxial birefringent crystal with an achromatic half-wave plate 105 sandwiched between them. The optic axis 107 and 109, respectively, of each of the uniaxial crystal plates makes an angle $\beta$ with the plate's face and the principal plane is oriented in the $\hat{X}$-$\hat{Z}$ plane as shown in FIG. 1. The vector directions are indicated by "$\wedge$" placed over the coordinate axes labels. Plate 103, otherwise identical to plate 101 is rotated 180° around the surface normal. The fast axis of half-wave plate 105 is set at 45° in the $\hat{X}$-$\hat{Y}$ plane. The incident light is linearly polarized at 45° in the $\hat{X}$-$\hat{Y}$ plane. The entire assembly 100 comprises a polarization shearing interferometer whose extreme symmetry causes the major effect to be a phase shift between the ordinary and extraordinary rays of the output beam:

$$\psi = 4\pi d/\lambda \; ((n_o - n_e)/n_o) \sin 2\beta \sin \theta \cos \phi \tag{1}$$

where $\psi$ is the phase shift between the X and Y components of the output beam;

d is the thickness of each of the uniaxial crystal plates 101, 103;

$\lambda$ is the incident light wavelength;

$n_o$ is the ordinary index of refraction of the birefringent crystal;

$n_e$ is the extraordinary index of refraction of the birefringent crystal;

$\beta$ is the optic axis angle of the uniaxial birefringent crystal plates;

$\theta$ is the angle of incident beam; and $\phi$ is the azimuthal angle of the incident beam.

Figure 2:
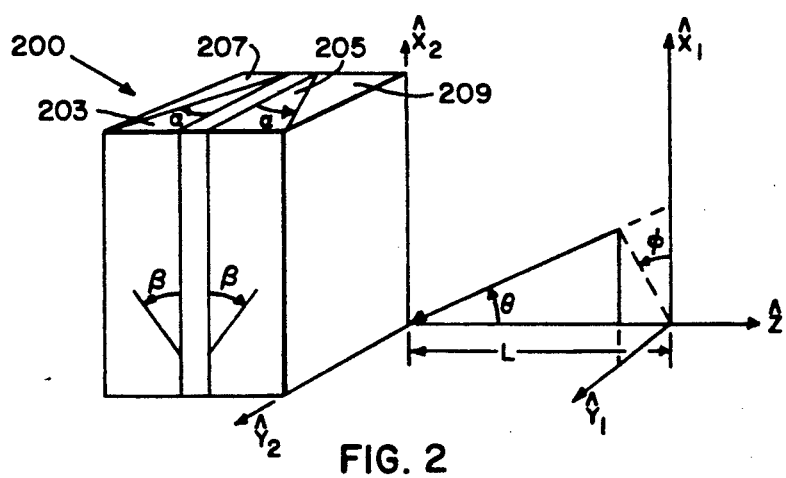
FIG. 2 depicts the preferred embodiment of the White Light Optical Fourier Transform Device.

The phase shift in equation (1) above depends on the uniaxial crystal thickness "d". If "d" is varied by the introduction of birefringent crystal wedges 203, 205 with a wedge angle $\alpha$ in place of uniaxial birefringent crystal plates 101, 103 as shown in FIG. 2, then the phase shift $\psi$ will also depend on the coordinate plane, $\hat{X}_2$-$\hat{Y}_2$, where the incoming light is incident. Two non-birefringent crystal wedges 207, 209 are placed adjacent to birefringent crystal wedges 203, 205, respectively, such that the wedge ends of the non-birefringent crystals point in the opposite direction from that of the wedge ends of the birefringent crystals. Non-birefringent wedges 207, 209 function to minimize the prism-angle deviation effect of the beam passing through the birefringent wedges and emanating therefrom. The resulting rectangular block structure 200 is the White Light Optical Fourier Transform Device. As shown in FIG. 2, thickness "d" of birefringent wedges 203, 205 depends on the wedge angle $\alpha$ and on the coordinate $Y_2$ and can be described by $$d = Y_2 \tan \alpha \tag{2}$$

Figure 3:
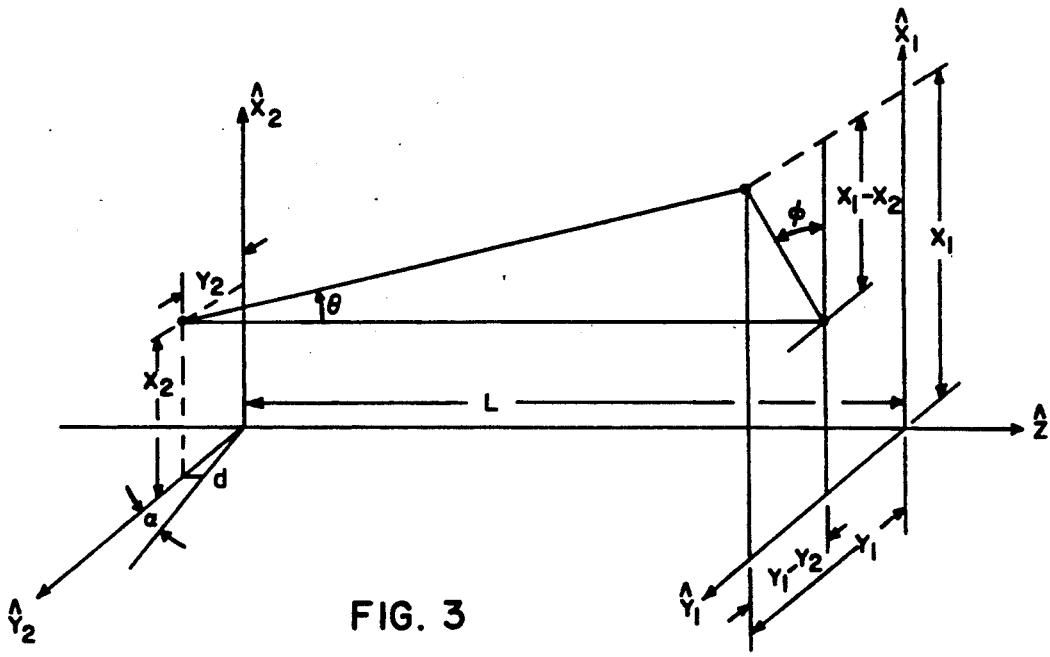
FIG. 3 illustrates the angular relationship of the incident beam with respect to the Transform Device.

The dependence of $\psi$ on incidental angle $\theta$ and azimuthal angle $\phi$ of the incoming beam is explained with a reference to $\hat{X}_1$-$\hat{Y}_1$ coordinate frame as shown in FIG. 3. The polar coordinate angles $\theta$ and $\phi$ can be expressed as a function of $Y_1$, $Y_2$ and L, thusly:

$$Y_1 - Y_2 = L \sin \theta \sin \phi / \cos \theta \tag{3}$$

and for the usual small angle approximation of $\sin \theta \approx \theta$, the phase shift $\psi$ contains the term $Y_1 Y_2$: ($\cos \theta \approx 1$)

$$\psi \approx (4\pi/\lambda L)(\Delta n/n) \sin 2\beta \tan \alpha \; (Y_1 Y_2 - Y_2^2) \tag{4}$$

where L is the distance between the two coordinate systems and $\Delta n/n$ is the relative birefringence of birefringent wedges 203 and 205.

The quadratic factor $Y_2^2$ is not affected by $Y_1$. The $Y_1Y_2$ phase factor is the basis of the Fourier transform in one dimension:

$$\mathfrak{F}(I_o) = \int I_o(Y_2) \cos(KY_1Y_2)dY_2 \quad (5)$$

Where "K" is the spatial frequency on the output plane. If a second such Fourier Transform Device 200 is placed following the first and rotated 90° around the incident face, the second device will produce a phase factor of form $X_1X_2$ which adds to the phase factor from the first Fourier Transform Device. The result of the combination is a two-dimensional Fourier transform phase factor:

$$\mathfrak{F}(I_o) = \iint I_o(X_2Y_2) \cos K[X_1X_2 + Y_1Y_2] \, dX_2 dY_2 \quad (6)$$

In another embodiment of the Transform Device, the wedge angle $\alpha$ is cut in the $\hat{X}\text{-}\hat{Z}$ plane rather than the $\hat{Y}\text{-}\hat{Z}$ plane, causing "d" to be governed by $$d = X_2 \tan \alpha \quad (7)$$

and the relevant phase factor for the device to be of the form $X_2Y_1$. This still produces a Fourier transform but with the output coordinate axes interchanged.

Figure 4:
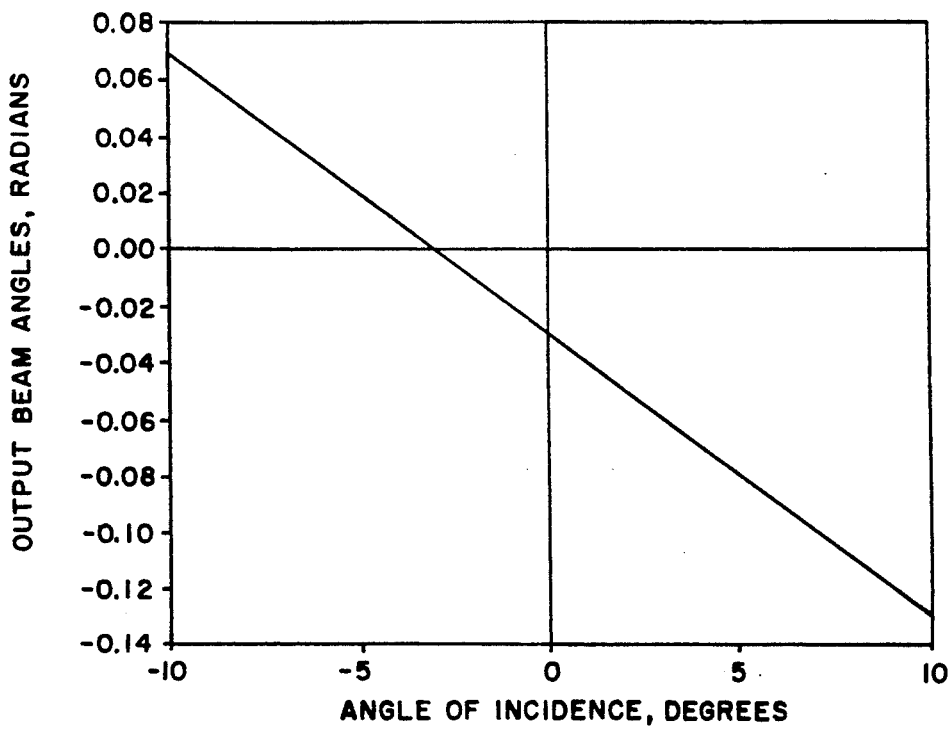
FIG. 4 is a graph of both of the wavefront angles.
Figure 5:
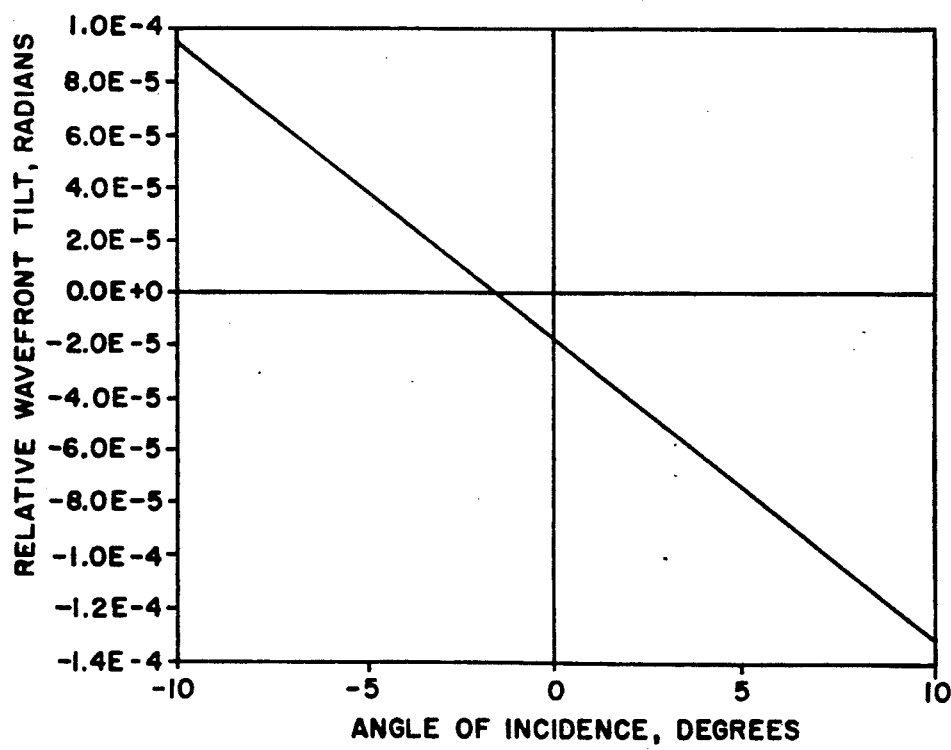
FIG. 5 graphically shows the linear relationship between the angle of incidence and the tilt angle of the output beam.

A polarization raytrace was performed with $\alpha = 10.5°$ and $\beta = 70°$. It computed the wavefront angles of the two polarization components of the output beam for incident angles between $+10°$ and $-10°$. FIG. 4 is a graph of both of the wavefront angles and FIG. 5 is a graph of the angular difference between the wavefronts. The two graph lines cannot be resolved on the scale used in FIG. 4 but they are shown on a finer scale in FIG. 5. FIG. 5 further illustrates that the relative tilt angle $\delta$ between the wavefronts was linearly proportional to the angle of incidence while FIG. 4 shows that both components of the output beam were slightly deflected due to a residual prism-angle effect. The raytrace gave:

$$\delta = 1.5 \times 10^{-5} + 6.3 \times 10^{-4} \theta \quad (8)$$

This is of the form $$\delta = a + b\theta \quad (9)$$

where
  $\delta$ is the wavefront tilt angle in radian;
  a is the angle between the beam components when $\theta = 0$;
  b is the proportionality constant (i.e. derivative of the angle between beam components with respect to angle of incidence); and
  $\theta$ is the angle of incidence in radians.

Figure 6:
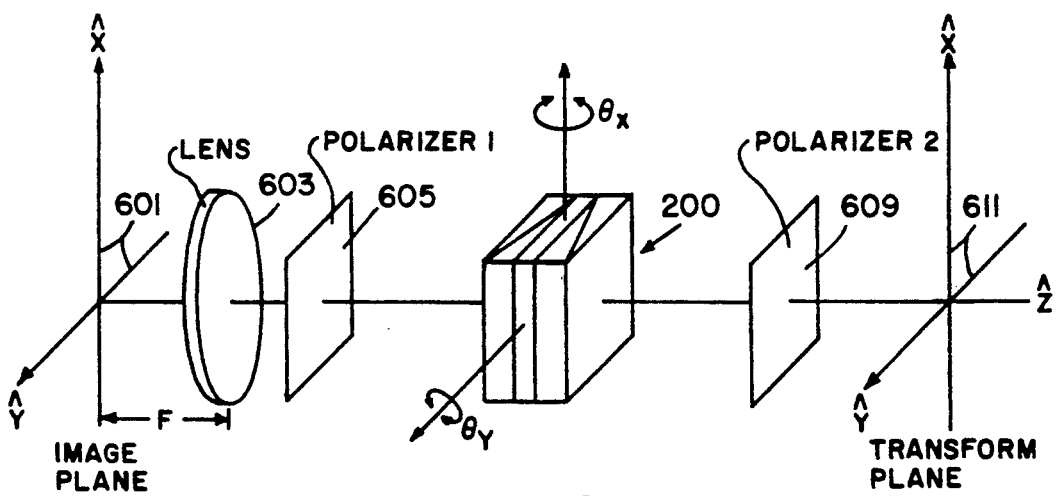
FIG. 6 shows a working alignment of the Transform Device with other optic elements for taking Fourier transform of an incident intensity image.

FIG. 6 is a drawing of an alignment of Transform Device 200 in relation to other optic elements to verify experimentally the critical linear relationship between the wavefront tilt angle and the angle of incidence and confirm the production of the Fourier transform of the intensity image. Theoretically, the two-beam output interference pattern is, in one dimension, $$I_{(x)} = \int I_o(X') \cos^2 KX dX' \quad (10)$$

where
  $I_{(x)}$ is the intensity output distribution;
  $I_o$ is the intensity input distribution;
  X' is the dimension of the image plane 601, which is the plane where the light source is located; and
  K is the spatial frequency on the output plane 611.

The interference pattern depends on the relative wavefront tilt angle $\delta$ which is linearly proportional to the angle of incidence $\theta$. Using $K = 2\pi\delta/\lambda$;
  $\delta = a + b\theta$;
  $\phi = X'/f$; and that
  f is the focal length of lens 603, gives, $$I_{(x)} = \tfrac{1}{2} \int I_o(X')dX' + \tfrac{1}{2} \int I_o(X') \cos[(2\pi X/\lambda f)(2af + 2bX')](dX') \quad (11)$$

Figure 7:
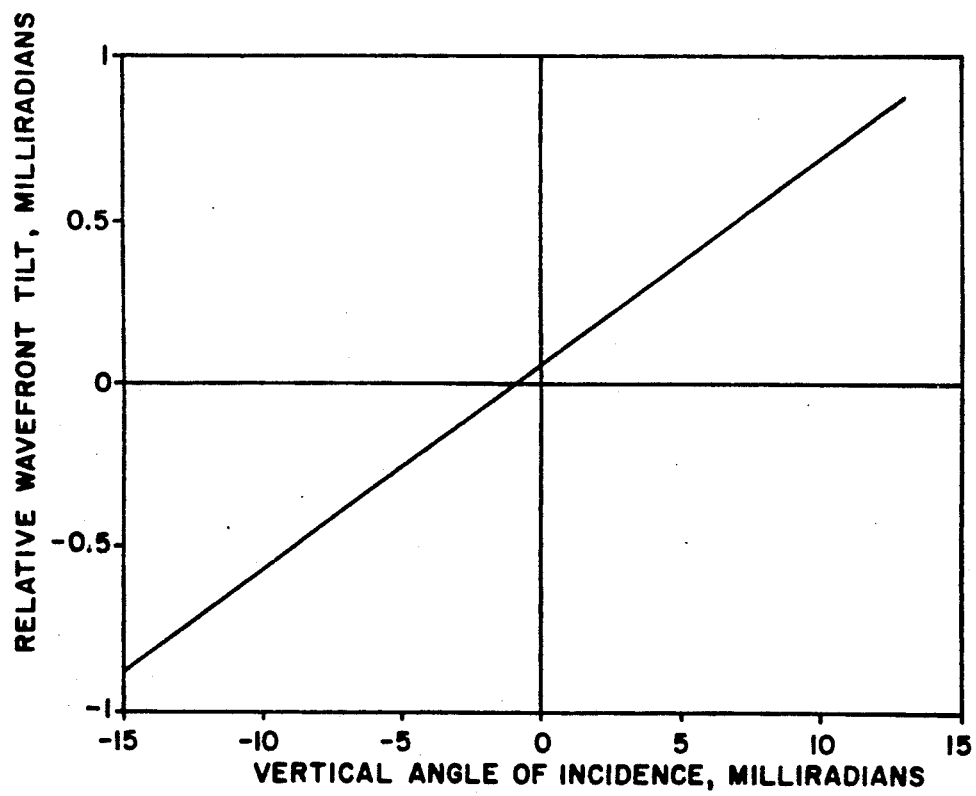
FIG. 7 is a graphic depiction of the experimental result which confirmed the linear relationship between the angle of incidence and wavefront tilt angle.

The small constant "a" can be absorbed by a coordinate origin shift in X' to give, $$I_{(x)} = \tfrac{1}{2}<I_o> + \tfrac{1}{2} \int I_o(X' - af/b) \cos(4\pi/\lambda f) bXX' \, dX' \quad (12)$$

which is the Fourier cosine transform of the incoherent object distribution added to a d.c. intensity average. In FIG. 6, a cone of light impinges on lens 603 having 390 mm focal length and is collimated thereby and directed to linear polarizer 605 polarized at $-45°$. The polarized beam then impinges on Transform Device 200 which is mounted on a stage having two transverse, mutually orthogonal tilt axes. Another polarizer 609, cross-polarized from polarizer 605, gives common polarization direction to the output beams impinging thereon from Transform Device 200 and causes an interference pattern to appear at the transform plane 611. What were observed at transform plane 611, during an experiment performed as described above, were equally spaced parallel fringes. The number of fringes was measured as a function of the lateral tilt of the Transform Device to give the experimental result, $$\delta_{exp} = 8.2 \times 10^{-5} + 6.4 \times 10^{-2} \theta_y + 6.2 \times 10^{-3} \theta_x \quad (13)$$

which is graphically described in FIG. 7. The fringes' spatial frequency vector was perpendicular to the effective displacement of the laser source, showing that the phase dependence was of the form $X_2Y_1$ as implied by equations (1) and (7). The experimental result confirms that the Transform Device produces the linear relationship between the wavefront tilt angle and the angle of incidence necessary to produce Fourier transform. The Transform Device worked both with laser light and completely incoherent white light.

The White Light Optical Fourier Transform Device has significant potential applications in matched-filter optical correlators, automatic image recognition systems which operate in the transform plane and in a variety of spectral Fourier transform architectures. It has the potential to be packaged as a compact lightweight add-on to a standard video camera.

Although a particular embodiment and form of this invention has been illustrated, it is apparent that various modifications and embodiments of the invention may be made by those skilled in the art without departing from the scope and spirit of the foregoing disclosure. Accordingly, the scope of the invention should be limited only by the claims appended hereto.

I claim:

1. An optical Fourier transform device for producing the Fourier transform of an intensity image in both coherent and incoherent lights, said device comprising: a first and a second uniaxial birefringent crystal wedges for passing optical energy therethrough, each wedge having a wedge angle and an optic axis at a predetermined acute angle to the surface of the crystal, said wedges being arranged in parallel such that said second wedge is placed in a mirror image position of said first wedge; a half-wave plate sandwiched between said wedges and fixably attached thereto for interchanging the paths of the extra-ordinary and ordinary rays as the rays pass through said half-wave plate; and a first and a second non-birefringent wedge-shaped crystals for minimizing the prism-angle deviation effect of a beam emanating therefrom, said first non-birefringent crystal being fixably attached to said first birefringent wedge and said second non-birefringent crystal being fixably attached to said second birefringent wedge such that the wedge ends of said non-birefringent crystals point in the opposite direction from the wedge ends of said birefringent wedges, thereby rendering a rectangular block shape to said Fourier transform device.

2. An optical Fourier transform device as described in claim 1, wherein the plane of said birefringent wedge angles and the plane of said optic axes of said birefringent wedges are perpendicular to each other.

3. An optical Fourier transform device as described in claim 2, wherein said half-wave plate is achromatic, has a fast axis at 45° and the plane of the fast axis is perpendicular to the wedge angle plane and the optic axis plane.

* * * * *